US007720713B1

(12) United States Patent
Clark et al.

(10) Patent No.: US 7,720,713 B1
(45) Date of Patent: May 18, 2010

(54) METHOD FOR DESIGNING AND PURCHASING A PRODUCT

(75) Inventors: Alan L Clark, Ann Arbor, MI (US); Ali Kamrani, Ann Arbor, MI (US); Peter Richard Sferro, Rochester, MI (US); Robert P. Humphrey, Saline, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/560,785

(22) Filed: Apr. 28, 2000

(51) Int. Cl.
*G06Q 30/00* (2006.01)

(52) U.S. Cl. .......................................................... 705/26

(58) Field of Classification Search .................. 705/26, 705/27

See application file for complete search history.

(56) References Cited

U.S. PATENT DOCUMENTS 4,459,663 A * 7/1984 Dye ............................ 705/29
5,119,307 A * 6/1992 Blaha et al. ................. 700/107
5,197,001 A * 3/1993 Mukherjee .................... 705/29
5,285,392 A * 2/1994 Kyle et al. .................. 700/100
5,515,269 A * 5/1996 Willis et al. .................... 705/29
5,646,862 A * 7/1997 Jolliffe et al. .................. 703/1
5,712,989 A * 1/1998 Johnson et al. ............... 705/28
5,796,614 A * 8/1998 Yamada ...................... 700/106
5,963,953 A * 10/1999 Cram et al. ................. 707/102
6,023,683 A * 2/2000 Johnson et al. ............... 705/26
6,230,066 B1 * 5/2001 Sferro et al. ................ 700/104
6,272,472 B1 * 8/2001 Danneels et al. .............. 705/27
2004/0098315 A1 * 5/2004 Haynes et al. ................ 705/26
2006/0218052 A1 * 9/2006 Haynes et al. ................ 705/26

* cited by examiner

*Primary Examiner*—Pierre E Elisca
(74) *Attorney, Agent, or Firm*—Tung & Associates

(57) ABSTRACT

A method 10 for designing and purchasing a product which allows the respective product and cost information associated with a variety of potential suppliers 36, 38 to be automatically queried.

13 Claims, 2 Drawing Sheets

10
IDENTIFY NEED — 12
IDENTIFY PRODUCT TO MEET THE NEED — 14
IDENTIFY COMPONENTS OF THE PRODUCT — 16
IDENTIFY ATTRIBUTES AND INTERRELATIONSHIP ATTRIBUTES — 18
IDENTIFYING A PLURALITY OF SUPPLIERS — 20
CREATING AN INFORMATION TEMPLATE — 29
SEARCHING EACH OF THE INFORMATION TEMPLATES — 40
IDENTIFYING AT LEAST ONE SUPPLIER — 22
CAUSING A DESIGN FILE TO BE CREATED — 58
TRANSMITTING DESIGN FILE — 60
SELECTIVELY USING DESIGN FILE TO CREATE 3D PROTOTYPE — 62
STORING 3D PROTOTYPE OF PRODUCT IN TEMPLATE DATABASE — 64
EVALUATE COMBINATIONS — 24
ISSUE RECOMMENDATIONS — 26
PURCHASING SAID PRODUCT — 66

METHOD FOR DESIGNING AND PURCHASING A PRODUCT

FIELD OF THE INVENTION

This invention relates to a method for designing and purchasing a product and more particularly, to a method for dynamically identifying and evaluating various products and for dynamically identifying and evaluating various components and suppliers which may be used to produce a product which meets a certain previously identified need.

BACKGROUND OF THE INVENTION

Products are typically designed to meet one or more needs or requirements of an organization or of certain customers of the organization. For example and without limitation, a vehicle manufacturing organization may require the production of a certain type of assembly which is to be deployed in one of the models or types of vehicles which the organization is producing or is planning to produce. As used within this description, the term "product" means any tangible item which must be created or obtained and which meets certain needs or requirements of a business organization and/or certain customers of such a business organization.

Typically such products may be obtained from a variety of sources. Components which may be cooperatively assembled to produce such products may also be and have traditionally been obtained from a variety of sources. While a plethora of product and component sources exist, it is difficult to identify and evaluate all of the items respectively provided by these various product and component suppliers and to evaluate all of the various combinations of components which may be used to produce the desired product in order to ensure that an acquired product meets the technical and cost objectives and constraints required by the organization and to ensure that a product is produced which "optimally" meets or exceeds the dynamically configurable technical and cost constraints and/or requirements of the business organization in a manner which is better than virtually or substantially all other potential and alternatively supplied products.

There is therefore a need for a method for designing and purchasing a product which overcomes at least some of the previously delineated drawbacks of prior product design and purchasing methodologies and which allows products, components, and sources, and/or providers of such products and components to be efficiently identified and evaluated.

SUMMARY OF THE INVENTION

It is a first object of the present invention to provide a method for designing and purchasing a product which overcomes at least some of the previously delineated drawbacks of prior purchasing and design methodologies.

It is a second object of the present invention to provide a method for designing and purchasing a product which overcomes at least some of the previously delineated drawbacks of prior purchasing and design methodologies and which dynamically identifies sources of the product and sources of components which may be cooperatively assembled to produce the product.

It is a third object of the present invention to provide a method for designing and purchasing a product which overcomes at least some of the previously delineated drawbacks of prior purchasing and design methodologies and which identifies potential sources of the product and/or of components which may be assembled to produce such a product while technically and economically evaluating each of the potentially sourced products and component combinations.

It is a fourth object of the present invention to provide a method for designing and purchasing a product which overcomes at least some of the previously delineated drawbacks of prior purchasing and design methodologies and which dynamically queries potential suppliers of such products for information effective to allow the potentially sourced products to be evaluated according to a dynamically configurable criteria.

It is a fifth object of the present invention to provide a method for designing and purchasing a product which allows potential sources of the product to be easily and quickly identified by use of a computerized analysis system and which further allows such identification by use of a human cognitive function.

According to a first aspect of the present invention a method for purchasing a product is provided. The method includes the steps of identifying a plurality of suppliers; creating an information template for each supplier; specifying the product; searching each of the information templates for the specified product; and reporting the results of the search.

According to a second aspect of the present invention a method for designing a product is provided. The method comprises the steps of fixing certain attributes of the product; using the fixed attributes to select at least one component which is used to construct the product; creating a database containing the identity of a first and a second supplier for the at least one component; querying the database, effective to identify a first supplier and a second supplier of the at least one component; contacting each of the first and second supplier by use of a global communications network to request a computer aided design file from each supplier describing the respective at least one component provided by the first and second suppliers; receiving the computer aided design file; and using the computer aided design file to evaluate the at least one component respectively provided by the first and second suppliers.

These and other features, aspects, and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
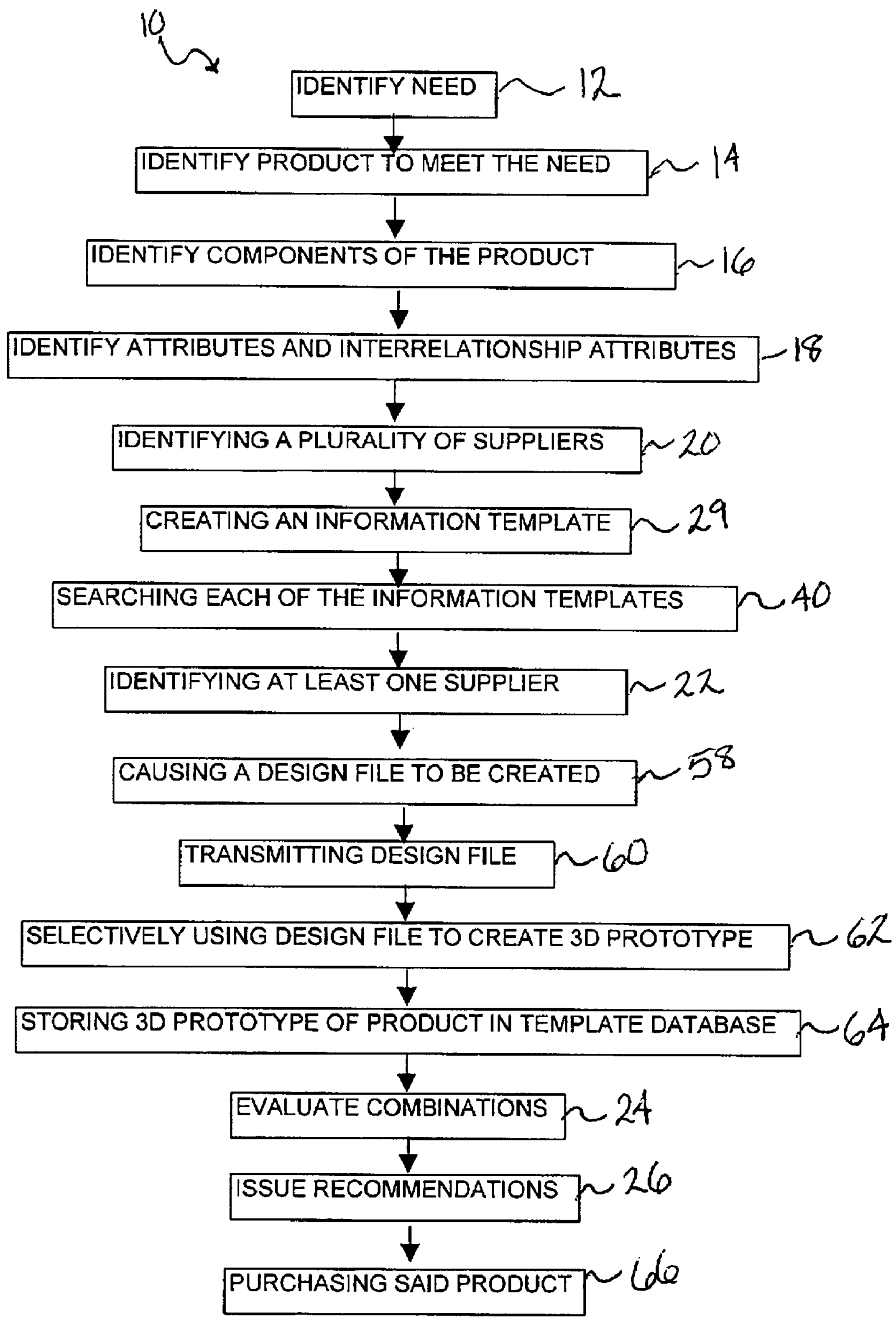
FIG. 1 is a flowchart illustrating the sequence of steps included within the methodology of the preferred embodiment of the invention.

Referring now to FIG. 1, there is shown a flowchart or sequence of steps 10 which comprises the methodology of the preferred embodiment of the invention. Particularly, methodology or flowchart 10 includes a first step 12 in which a need within a business organization is identified. For example, two portions or elements within a vehicle may be required to be movably coupled in order to achieve some overall function or objective.

Step 14 follows step 12, and in this step, a product (i.e., a tangible item) is identified to meet this perceived need. For example, a gearing assembly may be needed to allow these two portions or elements to be coupled in the desired manner. Step 16 follows step 14 and, in this step, the individual components of the needed assembly are identified or "decomposed". For instance, the needed gear assembly may require a pair of dissimilar gears which are coupled in a certain manner in order to provide the desired coupling function. Therefore, in this step 16, the basic tangible elements which cooperatively form the product are identified. In one non-limiting embodiment, this decomposition identifies the items of the assembly which are to be interconnected. In other non-limiting embodiments of the invention other "intangible" decompositions may be accomplished including the creation of an acquisition cost range (i.e., the amount of money that the organization is willing to pay for the product) or the creation of an acceptable acquisition time frame (i.e., the range of time over which the product must be acquired). Other non-tangible constraints and/or requirements may also be identified and/or created in this step 16.

Step 18 follows step 16, and in this step, the attributes or characteristics of the product and the components and any interrelationship attributes (i.e., attributes related to the interrelationship of the product to other products or components) are identified. Such attributes and characteristics may included the overall function, size, weight, shape, pitch, hardness, and various other measurable features of each of the previously identified components and of the overall product. Step 20 follows step 18, and in this step, a search is made for suppliers which source or provide both the final assembly or product and/or the individual components which may be used to construct the final assembly and which have previously been identified within step 16.

Step 22 follows step 20, and in this step, all permissible combinations of components suppliers and all final assembly or products suppliers are dynamically and automatically created or identified. Step 24 follows step 22, and in this step, all of the products and groups of components which may selectively form the product are evaluated by use of the previously created tangible and intangible constraints. That is, the products and components which are "sourced" by these suppliers are "evaluated" in order to ensure that they respectively meet the previously identified technical and intangible requirements. The last step of process 10 requires that a recommendation be issued or generated which specifies the identity of the desired final assembly provided or combination of component providers. It should be realized that the supplier search may be done at substantially the same time as the attributes are created within step 18. The recommendations may be used to purchase and/or otherwise acquire a product (Step 66).

Figure 3:
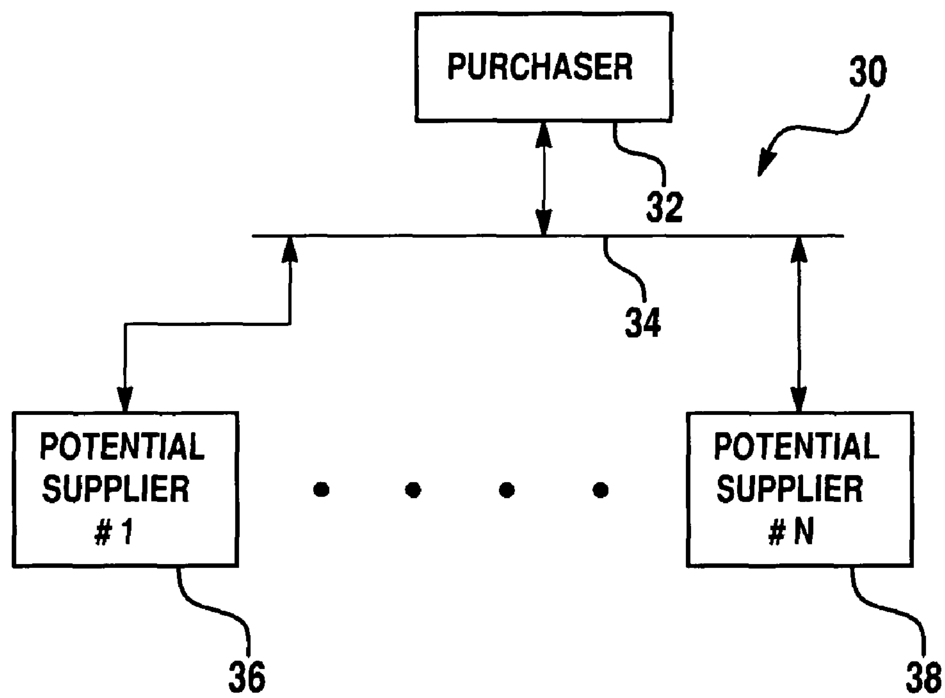
FIG. 3 is a block diagram of a computer architecture which may be used to accomplish the methodology of the preferred embodiment of the invention.

To better understand the operation of the methodology 10 reference is now made to the computer architecture configuration 30 of FIG. 3 which requires the purchasing business organization to have a computer 32 which is communicatively and physically coupled to a global communication network 34 such as the Internet. Each prospective supplier, such as suppliers 36 and 38 are also physically and communicatively coupled to the communications network 34, effective to allow the query which is required by step 20 to be dynamically and automatically accomplished by computer 32 through the use of communications network 34.

Figure 2:
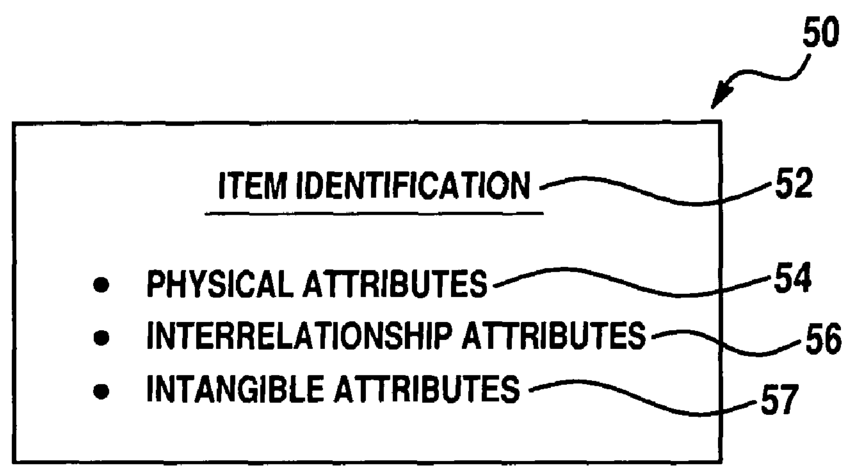
FIG. 2 is one non-limiting example of an information template which may be used by the methodology of the preferred embodiment of the invention.

In order to allow the data or information to be efficiently categorized and acquired, each supplier 36, 38 is required to have a template such as template 50 in FIG. 2. Particularly, template 50 includes a first dynamically configurable and searchable field 52 which identifies an item (i.e. a final assembly or component). Template 50 further includes a dynamically configurable and searchable field 54 which specifies the physical attributes of the item and a dynamically configurable and searchable field 56 which specifies the attributes related to the interrelationship of this item to other items or components. An intangible field 57 is also used to specify the cost, availability, and other intangible attributes. These templates 50 are created for each component, product or final assembly which is produced by each respective supplier 36, 28 (Step 29) and are dynamically updated to allow modifications and changes to be made to the products and to reflect the creation of new products and components. The information on these templates is then used, by purchaser 32, to determine whether a certain provided product or a certain provided component in combination with one or more other components meets the needs of the organization (Step 40). In other non-limiting embodiments, computerized design files may be transmitted by the potential supplier 36, 38 to the purchaser 32 (Step 60), effective to allow the purchaser 32 to determine whether the sourced components and/or product meets the technical need of the organization by causing a design file to be created (Step 58). These files may also selectively be used to construct a three dimensional prototype (Step 62) as described within the text entitled *Direct Engineering-Toward Intelligent Manufacturing* edited by Ali K. Kamrani and Peter R. Sferro (Kluwer Academic Publishers), ISBN 0-7923-8338-9, which is fully and completely incorporated herein by reference. These templates 50 may also be manually searched by an individual, effective to allow for human cognitive product and component identification. Moreover, each template 50 may be selectively stored within a single database (Step 64).

It should be realized that the invention is not limited to the exact construction and method which has been previously discussed but that various modifications may be made without departing from the spirit and the scope of the invention as is more fully delineated in the following claims.

What is claimed is:

1. A method for purchasing a product comprising the steps of:

providing a communications network having a computer including at least one purchaser and a plurality of suppliers that are each physically and communicatively coupled to the communications network;

identifying a plurality of suppliers;

creating an information template that is queried and dynamically configurable on the computer within the communications network for each of the plurality of suppliers wherein each of the information template specifies a product having at least one component disposed within the product;

searching each of the information templates selectively stored within a database for the specified at least one component disposed within the product;

identifying at least one supplier from the plurality of suppliers by use of said search;

causing a design file of said product to be created within the communications network by performing the steps of transmitting at least one computerized design file associated with the at least one component disposed within said product created from each of said identified suppliers from the plurality of suppliers to a purchaser, and selectively using said at least one transmitted computerized design file associated with the at least one component disposed within said product to create a three dimensional prototype of said product; and purchasing said at least one component disposed within the product from said at least one identified supplier from the plurality of suppliers.

2. The method of claim 1 further comprising the steps of:

placing certain information on said information template of said identified supplier related to the cost of producing said product; and reporting said certain information.

3. The method of claim 2 further comprising the steps of:

storing said three dimensional prototype of said product within an associated information template database; and evaluating said design file before purchasing said product.

4. The method of claim 1 further comprising the step of:

creating information relating to the operation of said product; and placing said information upon said template of said identified supplier.

5. The method of claim 1 wherein said product is selectively assembled within a vehicle.

6. The method of claim 1 wherein said templates are searched over a global computer network.

7. The method of claim 6 wherein said global computer network comprises the internet.

8. The method of claim 1, wherein the product having the at least one component disposed within the product is used in an automotive vehicle.

9. The method of claim 1, wherein the product has a plurality of interconnected components disposed therewithin and wherein the interrelationship of the components are specified within the dynamically configurable information template.

10. A method for purchasing a product comprising the steps of:

providing a communications network having a computer including at least one purchaser and a plurality of suppliers that are each physically and communicatively coupled to the communications network;

fixing attributes of said product having several interconnected components;

decomposing said product into several interconnected components;

identifying a plurality of suppliers;

creating an information template having a dynamically configurable and searchable field that is queried on the computer within the communications network, wherein the dynamically configurable and searchable field is configured on the computer to specify a plurality of interrelationship attributes related to the interrelationship of the several interconnected components of said product associated with each of said plurality of suppliers and wherein the interrelationship attributes of said components further define the overall function of each of the several interconnected components; and searching said information templates in order to identify suppliers of said product and said several interconnected components.

11. The method of claim 10 further comprising the step of:

identifying at least one supplier of said product by use of said information templates.

12. The method of claim 11 further comprising the step of:

identifying at least one supplier from a plurality of suppliers for each of said several interconnected components by use of said information templates.

13. The method of claim 10, wherein the step of creating the information template further comprises the step of:

specifying a plurality of attributes related to the interrelationship of the product to other products.

* * * * *